United States Patent
Ray et al.

(10) Patent No.: US 6,940,545 B1
(45) Date of Patent: Sep. 6, 2005

(54) FACE DETECTING CAMERA AND METHOD

(75) Inventors: Lawrence A. Ray, Rochester, NY (US); Henry Nicponski, Albion, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/514,436

(22) Filed: Feb. 28, 2000

(51) Int. Cl.[7] .......................... H04N 9/04; H04N 5/228; G06K 9/00; G06K 9/36

(52) U.S. Cl. ............................. 348/222.1; 348/231.99; 348/207.99; 382/118; 382/289

(58) Field of Search ........................... 348/207.99, 169, 348/77, 268, 208.13, 208.14; 382/118, 116, 382/282, 289, 237, 170

(56) References Cited

U.S. PATENT DOCUMENTS

| | | |
|---|---|---|
| 4,503,508 A | 3/1985 | Brooks et al. |
| 5,012,522 A | 4/1991 | Lambert |
| 5,086,480 A | 2/1992 | Sexton |
| 5,103,254 A | 4/1992 | Bell et al. |
| 5,164,992 A | 11/1992 | Turk et al. |
| 5,283,644 A | 2/1994 | Maeno |
| 5,430,809 A | 7/1995 | Tomitaka |
| 5,432,863 A * | 7/1995 | Benati et al. ............... 382/167 |
| 5,432,864 A | 7/1995 | Lu et al. |

(Continued)

FOREIGN PATENT DOCUMENTS

| | | | | |
|---|---|---|---|---|
| JP | 03144427 A * | 6/1991 | .......... | G03B 15/05 |

OTHER PUBLICATIONS

"Face Detection from Color Images Using a Fuzzy Pattern Matching Method" by Halyuan Wu et al.. IEEE Transactions on Pattern Analyssis and Machine Intelligence, vol. 21, No. 6, Jun. 1999.*

(Continued)

*Primary Examiner*—Tuan Ho
*Assistant Examiner*—Lin Ye
(74) *Attorney, Agent, or Firm*—David M. Woods; Pamela R. Crocker

(57) ABSTRACT

A method for determining the presence of a face from image data includes a face detection algorithm having two separate algorithmic steps: a first step of prescreening image data with a first component of the algorithm to find one or more face candidate regions of the image based on a comparison between facial shape models and facial probabilities assigned to image pixels within the region; and a second step of operating on the face candidate regions with a second component of the algorithm using a pattern matching technique to examine each face candidate region of the image and thereby confirm a facial presence in the region, whereby the combination of these components provides higher performance in terms of detection levels than either component individually. In a camera implementation, a digital camera includes an algorithm memory for storing an algorithm comprised of the aforementioned first and second components and an electronic processing section for processing the image data together with the algorithm for determining the presence of one or more faces in the scene. Facial data indicating the presence of faces may be used to control, e.g., exposure parameters of the capture of an image, or to produce processed image data that relates, e.g., color balance, to the presence of faces in the image, or the facial data may be stored together with the image data on a storage medium.

38 Claims, 15 Drawing Sheets

U.S. PATENT DOCUMENTS

| | | | |
|---|---|---|---|
| 5,629,752 A | | 5/1997 | Kinjo |
| 5,642,431 A | | 6/1997 | Poggio et al. |
| 5,687,412 A | * | 11/1997 | McIntyre .................... 396/319 |
| 5,710,833 A | | 1/1998 | Moghaddam et al. |
| 5,715,325 A | * | 2/1998 | Bang et al. ................. 382/118 |
| 5,719,951 A | | 2/1998 | Shackleton et al. |
| 5,749,000 A | | 5/1998 | Narisawa |
| 5,781,665 A | * | 7/1998 | Cullen et al. ............... 382/254 |
| 5,835,616 A | | 11/1998 | Lobo et al. |
| 5,850,470 A | * | 12/1998 | Kung et al. ................. 382/157 |
| 5,870,138 A | | 2/1999 | Smith et al. |
| 5,873,007 A | * | 2/1999 | Ferrada Suarez ........... 396/296 |
| 5,973,734 A | * | 10/1999 | Anderson ................... 348/239 |
| 5,986,764 A | * | 11/1999 | Nonaka ...................... 356/390 |
| 6,035,074 A | * | 3/2000 | Fujimoto et al. ........... 382/282 |
| 6,263,113 B1 | * | 7/2001 | Abdel-Mottaleb et al. .. 382/237 |
| 6,271,876 B1 | * | 8/2001 | McIntyre et al. ............. 348/46 |
| 6,278,491 B1 | * | 8/2001 | Wang et al. ................ 348/370 |
| 6,301,440 B1 | * | 10/2001 | Bolle et al. ................. 396/128 |
| 6,332,033 B1 | * | 12/2001 | Qian .......................... 382/124 |
| 6,597,817 B1 | * | 7/2003 | Silverbrook ................ 382/289 |
| 6,608,914 B1 | * | 8/2003 | Yamaguchi et al. ........ 382/118 |

OTHER PUBLICATIONS

"Prababilistic Modeling of Local Appearance and Spatial Relationships for Object Recognition" by henrty Schneiderman and Takeo Kanade. Proc. CVPR 1998, 45-51.*

"Photographic Composition" by Tom Grill and Mark Scanlon. Amphoto Books, 1990, p. 22.

"Face Detection from Color Images Using a Fuzzy Pattern Matching Method" by Halyuan Wu, Qian Chen, and Masahiko Yachida. IEEE Transactions on Pattern Analysis and Machine Intelligence, vol. 21, No. 6, Jun. 1999.

"Prababilistic Modeling of Local Appearance and Spatial Relationships for Object Recognition" by Henry Schneiderman and Takeo Kanade. Proc. CVPR 1998, 45-51.

* cited by examiner

FACE DETECTING CAMERA AND METHOD

FIELD OF THE INVENTION

The present invention is in the field of image capture, and in particular in the field of image processing for the purpose of enhancing and optimizing the process of image capture by a camera.

BACKGROUND OF THE INVENTION

A preponderance of images collected by photographers contain people, which are often the most important subjects of the images. Knowledge of the presence and location of people in an image, and especially the presence and location of their faces, could enable many beneficial improvements to be made in the image capture process. Some are suggested in the prior art. For example, automatic and semi-automatic focusing cameras often pick a portion of the scene on which to adjust for best focus. If the camera could locate the faces in a scene, then focus could be optimized for the faces unless the photographer explicitly overrides that choice. In U.S. Pat. No. 5,835,616 a face detection system is used in automated photography to eliminate manual adjustment problems that can result in poor quality from lack of focused subjects.

Furthermore, detection of the faces in a scene gives very strong evidence of the proper location of the principal subject matter. In that connection, the process disclosed in the '616 patent automatically finds a human face in a digitized image taken by a digital camera, confirms the existence of the face by examining facial features and then has the camera automatically center itself on the detected face. Detection of a face also yields strong evidence of proper color balance for the facial and/or skin area. For example, in U.S. Pat. No. 5,430,809 a video camera autonomously tracks a facial target in order to set a measuring frame on the facial object for purpose of auto exposure and auto focus. In addition, once the measuring frame is set, an auto white balance system adjusts colors to obtain optimal skin color on the face. As a result, the auto white balance system is said to perform auto skin color balance. It is also known (from U.S. Pat. No. 5,629,752) to detect a human face and then to utilize data representing color and/or density of the facial region to determine an exposure amount such that the region corresponding to the face can be printed appropriately by a photographic printer.

While face detection has been studied over the past several years in relation to the subject of image understanding, it remains an area with impressive computational requirements, particularly if a robust face detection algorithm is needed. A number of methods have been devised that show reasonable performance over a range of imaging conditions. Such methods may be more successfully implemented in large scale processing equipment, such as photographic printers, which have relatively sophisticated processing capability (compared to a hand-held camera). The challenge is to implement these face detection methods reasonably in a camera with limited memory resources, and with low computational cost. If this can be done successfully, the detection of faces in a scene will then serve as a springboard to numerous other improvements in the image capture process. In addition, it would be useful to detect faces in order to implement downstream activities after image capture, e.g., face detection could provide evidence of up/down orientation for subsequent printing (for example, of index prints).

SUMMARY OF THE INVENTION

It is an object of the invention to capture images and detect one or more of the human faces contained in the images, for the purposes of adding value to the image capture process and improving quality in the captured image.

The present invention is directed to overcoming one or more of the problems set forth above. Briefly summarized, according to one aspect of the present invention, a method for determining the presence of a face from image data includes a face detection algorithm having two separate algorithmic steps: a first step of prescreening image data with a first component of the algorithm to find one or more face candidate regions of the image based on a comparison between facial shape models and facial probabilities assigned to image pixels within the region; and a second step of operating on the face candidate regions with a second component of the algorithm using a pattern matching technique to examine each face candidate region of the image and thereby confirm a facial presence in the region, whereby the combination of these components provides higher performance in terms of detection levels than either component individually. In a camera implementation, a digital camera includes an algorithm memory for storing an algorithm comprised of the aforementioned first and second components and an electronic processing section for processing the image data together with the algorithm for determining the presence of one or more faces in the scene. Facial data indicating the presence of faces may be used to control, e.g., exposure parameters of the capture of an image, or to produce processed image data that relates, e.g., color balance, to the presence of faces in the image, or the facial data may be stored together with the image data on a storage medium.

In another aspect of the invention, a digital camera includes a capture section for capturing an image and producing image data; an electronic processing section for processing the image data to determine the presence of one or more faces in the scene; face data means associated with the processing section for generating face data corresponding to attributes of at least one of the faces in the image; a storage medium for storing the image data; and recording means associated with the processing section for recording the face data with the image data on the storage medium. Such face data corresponds to the location, orientation, scale or pose of at least one of the faces in the image.

In a further aspect of the invention, a digital camera includes an algorithm memory storing a face detection algorithm for determining the presence of one or more faces in the image data and a composition algorithm for suggesting composition adjustments based on certain predetermined composition principles; and an electronic processing section for processing the image data together with the algorithms for determining the presence of one or more faces in the scene and their relation to certain predetermined composition principles. The processing section then generates face data corresponding to the location, orientation, scale or pose of at least one of the faces in the image as well as composition suggestions corresponding to deviation of the face data from the predetermined composition principles.

In yet a further aspect of the invention, a hybrid camera is disclosed for capturing an image of a scene on both an electronic medium and a film medium having a magnetic layer. The hybrid camera includes an image capture section for capturing an image with an image sensor and producing image data; means for capturing the image on the film medium; an electronic processing section for processing the image data to determine the presence of one or more faces in the scene; face data means associated with the electronic processing section for generating face data corresponding to at least one of the location, scale and pose of at least one of the faces in the image; and means for writing the face data on the magnetic layer of the film medium.

In still a further aspect of the invention, the present invention includes a camera incorporating a digital image sensor, a central processing unit such as a microprocessor, a means of detecting a face, and a means of displaying the location of detected faces to the photographer. The advantage of each aspect described is that the camera can use the face detection capability to improve the picture taking experience for the user, as well as provide numerous suggestions to the photographer to obtain better and more pleasing photographs.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems employing electronic and film capture are well known, the present description will be directed in particular to attributes forming part of, or cooperating more directly with, systems and apparatus in accordance with the present invention. System attributes and component apparatus not specifically shown or described herein may be selected from those known in the art. In the following description, a preferred embodiment of the face detection algorithm would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the face detection aspect of the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
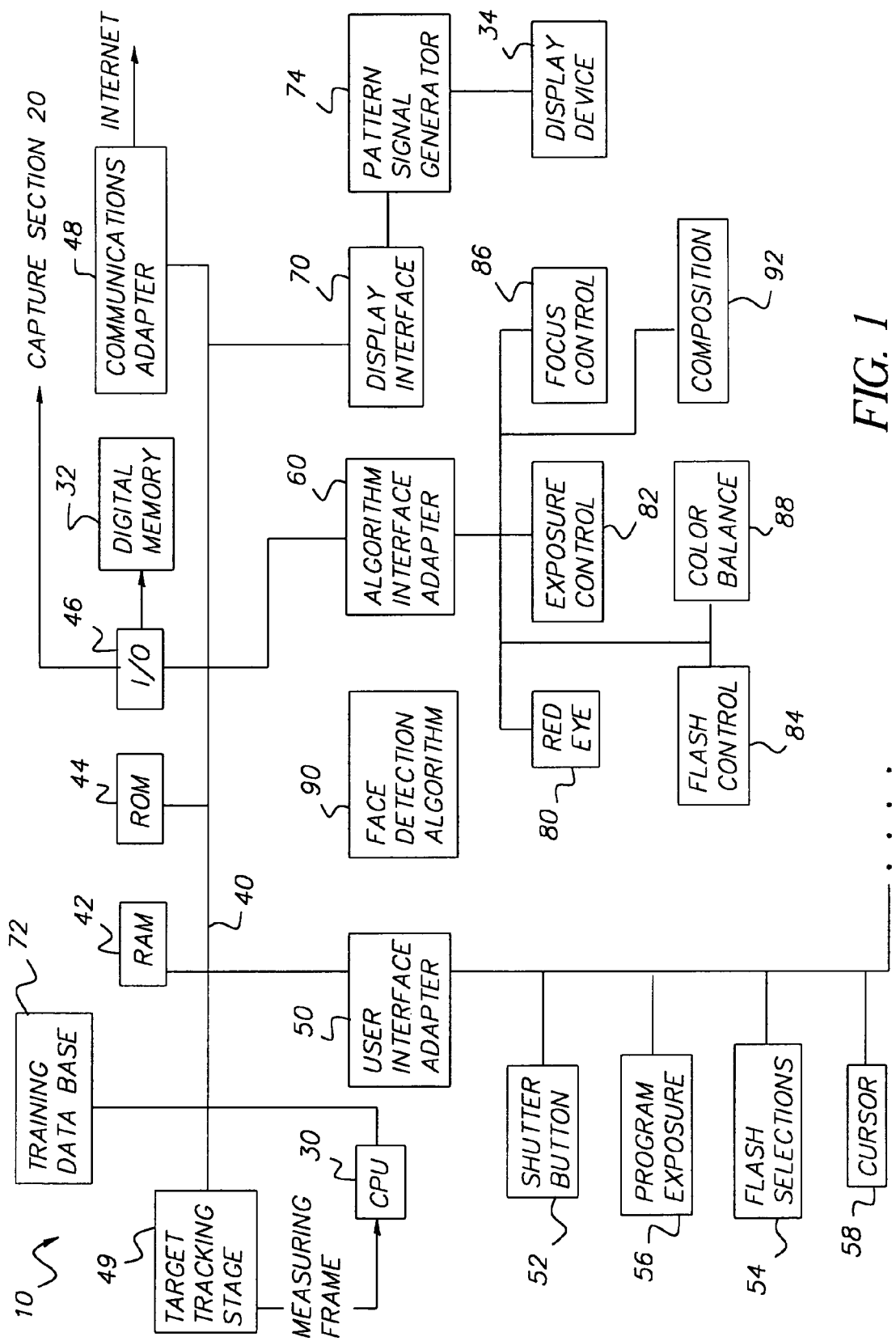
FIG. 1 is a block diagram of a face detecting camera showing an arrangement of camera elements in accordance with the invention.
Figure 2:
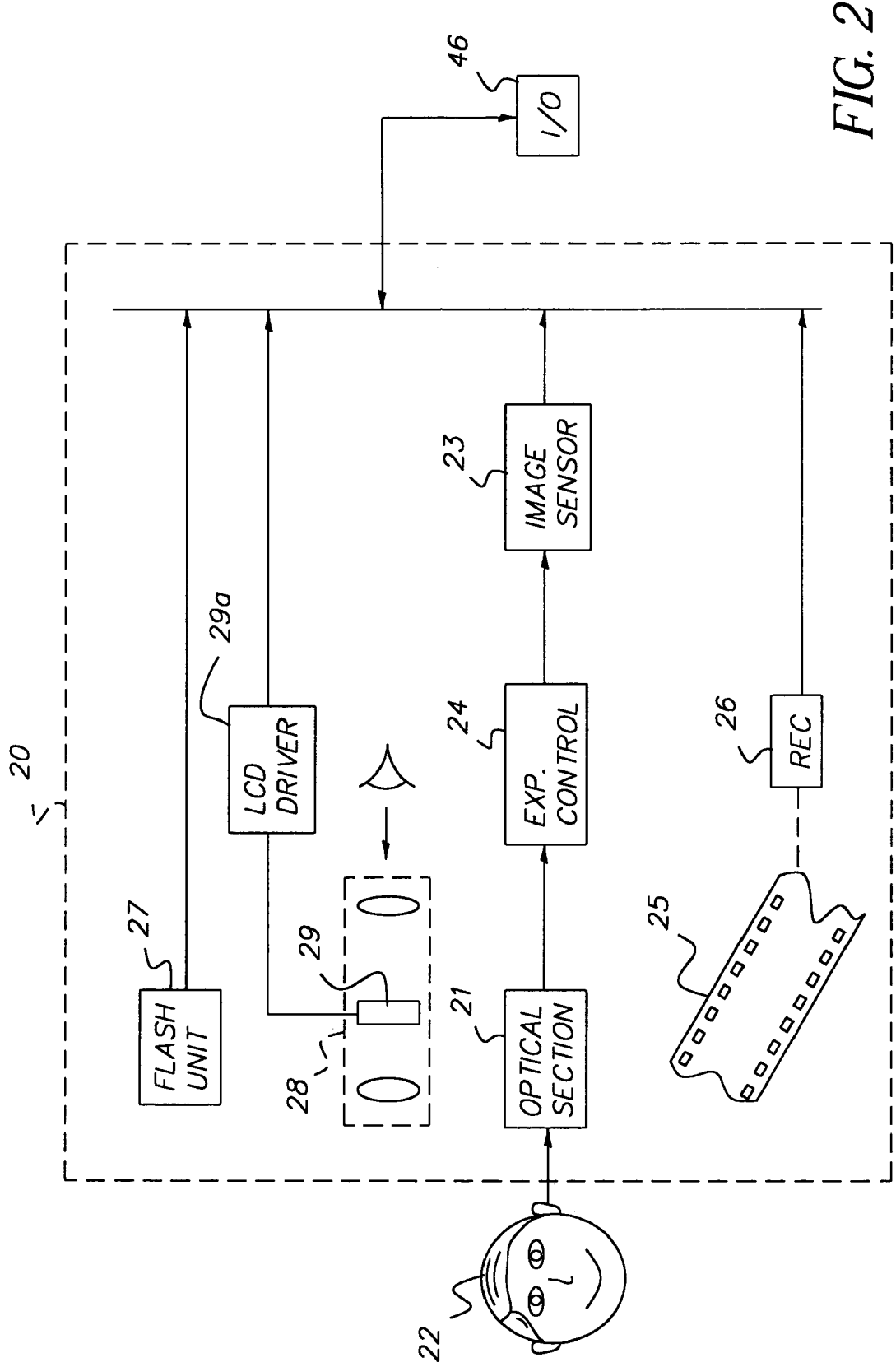
FIG. 2 is a block diagram of the image capture section of the camera shown in FIG. 1.

Referring now to the block diagrams of FIGS. 1 and 2, a camera 10 is shown as an integrated system embodying the components of a standard camera, including an image capture section 20, a processor or central processing unit (CPU) 30, a digital memory 32 for storing captured images and associated annotations related to the images, and a display device 34 for displaying captured images and/or other data useful in operation of the camera. The capture section 20 includes an optical section 21 having autofocus capability for focusing an image 22 (including, for purposes of this description, one or more faces) upon an image sensor 23, such as a conventional charge-coupled device (CCD). An exposure control mechanism 24 includes an aperture and shutter for regulating the exposure of the image upon the image sensor 23. Instead of (or in addition to) an electronic capture device, the capture section may include an analog storage device 25, such as a conventional photographic film. In the case of well-known APS film, which includes a magnetic recording layer, a recording device 26 can record annotation data regarding the captured images on the magnetic layer. A flash unit 27 is also provided for illuminating the image 22 when ambient light is insufficient.

The CPU 30 is interconnected via a system bus 40 to a random access memory (RAM) 42, a read-only memory (ROM) 44, an input/output (I/O) adapter 46 (for connecting the capture section 20, the digital memory 32, the recording unit 26 and the flash 27 to the bus 40), a communication adapter 48 (for connecting directly to an information handling system or a data processing network, such as the Internet), a target tracking stage 49 (for generating a measuring frame 49a that tracks the faces), a user interface adapter 50 (for connecting user interface devices such as a shutter button 52, flash controls 54, programmed exposure selections 56, a user manipulated display cursor 58 and/or other user interface devices to the bus 40), a algorithm interface adapter 60 (for connecting various stored algorithms to the bus 40, including a face detection algorithm 90) and a display interface 70 (for connecting the bus 40 to the display device 34). The CPU 30 is sufficiently powerful and has sufficient attached memory 42 and 44 to perform the face detection algorithm 90. A training database 72, connected to the bus 40, contains sufficient training data to enable the face detection algorithm 90 to work for a very wide range of imaging conditions. In the preferred embodiment, as will be described in detail, the face detection algorithm includes two component algorithms: a first component algorithm that estimates a face candidate region of the image based on a comparison between facial shape models and facial probabilities assigned to image pixels within the region and a second component algorithm operative on the face candidate region using pattern analysis to examine each region of the image and thereby confirm a facial presence in the region. The advantage of this combination is that the first component algorithm can be designed to operate quickly albeit with the potential for false positives and the second component algorithm can restrict its more computationally intensive processing to the relatively few regions that have passed the first algorithm.

The results of face detection are used to control a number of functions of the camera, which are embodied in the algorithms connected to the data bus 40 through the interface adapter 60. The face detection results are tracked by the target tracking stage 49, which sets and manipulates the measuring frame 49a to track, e.g., the centroid of one or more face locations. The measuring frame is used as described in U.S. Pat. No. 5,430,809, which is incorporated by reference, to limit the data collected for purposes of autofocus, auto exposure, auto color balance and auto white balance to the facial areas. The measuring frame may be a small spot-like area or it may be configured to have borders generally coinciding with the borders of one or more faces; in either case it is intended to confine the data collected for the algorithms to face data or some sample thereof. These algorithms include a red eye correction algorithm 80, an exposure control algorithm 82, a flash control algorithm 84, a focus control algorithm 86, a color balance algorithm 88 and a composition algorithm 92. The red eye correction algorithm 80 adjusts the stored digital pixel values to remove a red eye condition produced by the flash unit 27. The exposure control algorithm 82 determines settings from the measuring frame 49a for the image exposure control mechanism 24 in the image capture section 20 of the camera so that the faces are properly exposed. In conjunction with the exposure control determination, the flash algorithm 84 determines whether or not to fire the flash for optimal capture of the facial images. The camera utilizes the focus algorithm 86 to derive distance data from the measuring frame 49a and to set a pointable focus mechanism in the optical section 21 using the results of a framing image so that a final captured image is properly focused on the face regions. The color balance algorithm 88 is applied to the digital image file in order to optimize the representation of the skin regions within the measuring frame 49a so that they match the expected color range of skin tones.

The image display device 34 enables a photographer to preview an image before capture and/or to view the last image captured. In addition, an optical viewfinder 28 is provided for previewing an image. Moreover, the CPU 30 may employ the face detection algorithm to highlight faces within the viewed image if needed. For this purpose, a semi-transparent liquid crystal display (LCD) overlay 29 may be provided in the optical viewfinder 28; an LCD driver 29a activates certain areas of the LCD overlay 29 corresponding to one or more face locations in response to face location data from the CPU 30 (such an LCD mask is disclosed in U.S. Pat. No. 5,103,254, which is incorporated herein by reference). Also, the CPU 30 can generate highlighted or outlined faces by driving the pattern generator 74 via the display interface 70 to display, e.g., a box over a face in a viewing area shown on the display device 34. Furthermore, the faces can be marked by a photographer by moving the cursor 58 on the viewing area of the display device 34 so that, e.g., it overlies a face or it draws a box around a face. This could also be done through the LCD driver 29a and the LCD overlay 29 in the optical viewfinder 28.

Another advantage of the present invention is that data associated with the detection of faces in an image could be automatically recorded and included with or as an annotation of an image. This permits the automatic recording of significant subjects within a photographic record of events without requiring the annotation to be done by the photographer at the time of image acquisition or at a later time. The detection of faces in the scene then opens the way for significant additional enhancements to the image capture event and to subsequent processing of the image. For example, face detection will provide a convenient means of indexing images for later retrieval, for example by fetching images containing one or more people as subjects. Consequently, running the face detection algorithm provides face data corresponding to one or more parameters such as location, orientation, scale and pose of one or more of the detected faces. In addition, once faces have been detected, a simple face recognition algorithm can be applied to identify faces from a small gallery of training faces that the camera has previously captured with help from the user and stored in a training data base. The results of face detection and location are stored in an auxiliary data location attached to the image, which are together stored in buffer memory in the RAM 42. Images are annotated, for example, with the coordinates of detected faces, estimates of face size, positions of the eyes, a rough estimate of the pose parameters of the head, and the identity of each individual. Once an image is selected for storage, the image and its annotation data can either be stored together in the digital image memory 32 or the annotations can be stored in the magnetic layer of the analogue image memory 25 (the image would be stored as a conventional latent image on the photographic emulsion). In one configuration for a digital camera, the captured image data is recorded in the storage medium in digital folders dedicated to images with a particular number of faces in the scenes.

It should also be understood that a further embodiment of the invention is a hybrid camera which simultaneously captures an image of a scene on both an electronic medium, such as the image sensor 23, and a film medium, such as the APS film 25. In this embodiment, the CPU 30 processes the image data from the image sensor 23 to determine the presence of one or more faces in the scene, and face data is generated corresponding to the location, scale or pose of at least one of the faces in the image. Such face data could be displayed to the user of the camera on the display 34 in order to evaluate the captured image. If the face data (or image) would suggest a problem with the captured image, the user would have the opportunity to recapture the image on another frame of the film 25. Additionally, the face data could be written on the magnetic layer of the film medium 25 by activation of the recording unit 26.

Figure 3:
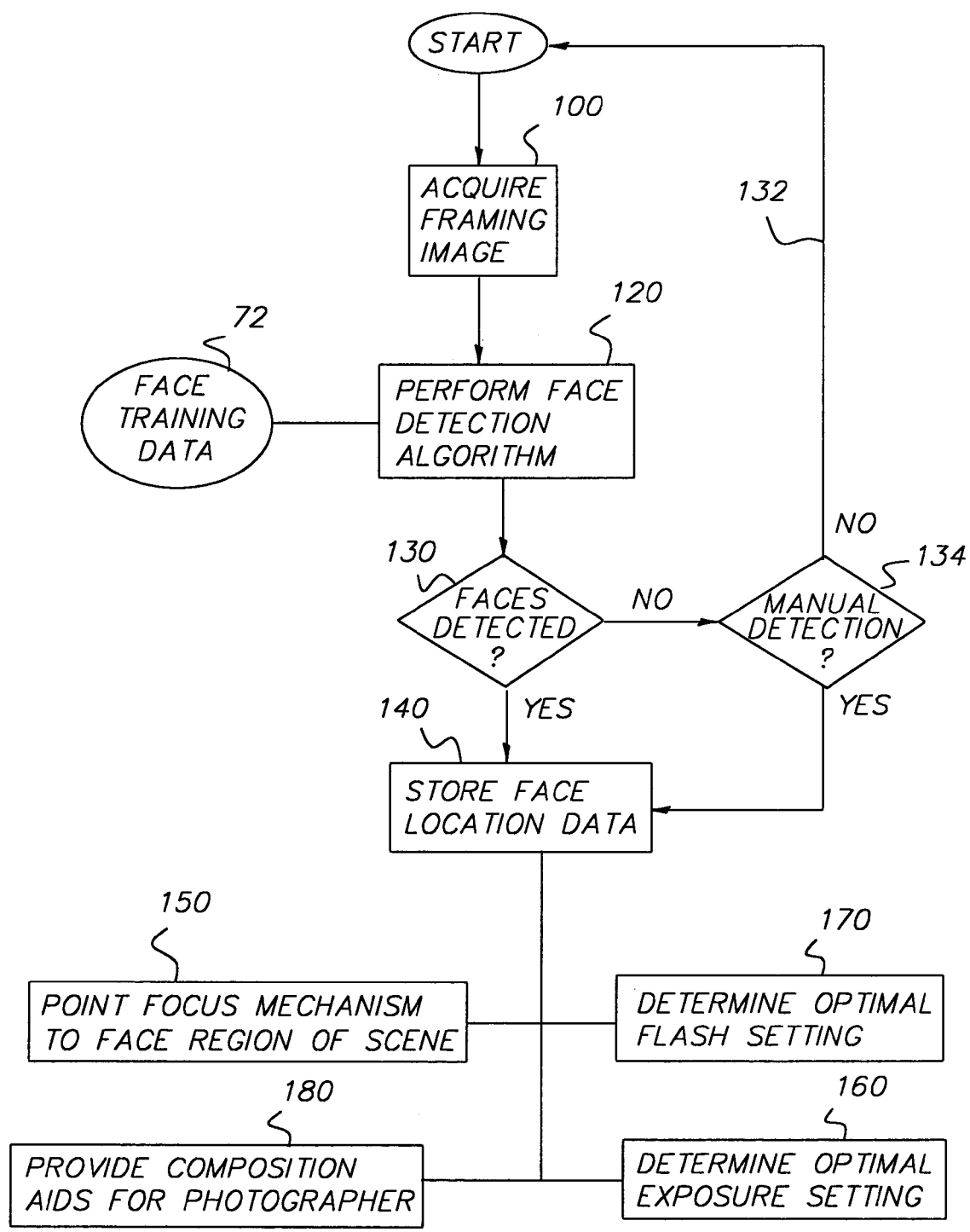
FIG. 3 is a flowchart diagram of camera operations involved in the operation of the camera shown in FIG. 1 in a framing image mode.
Figure 4:
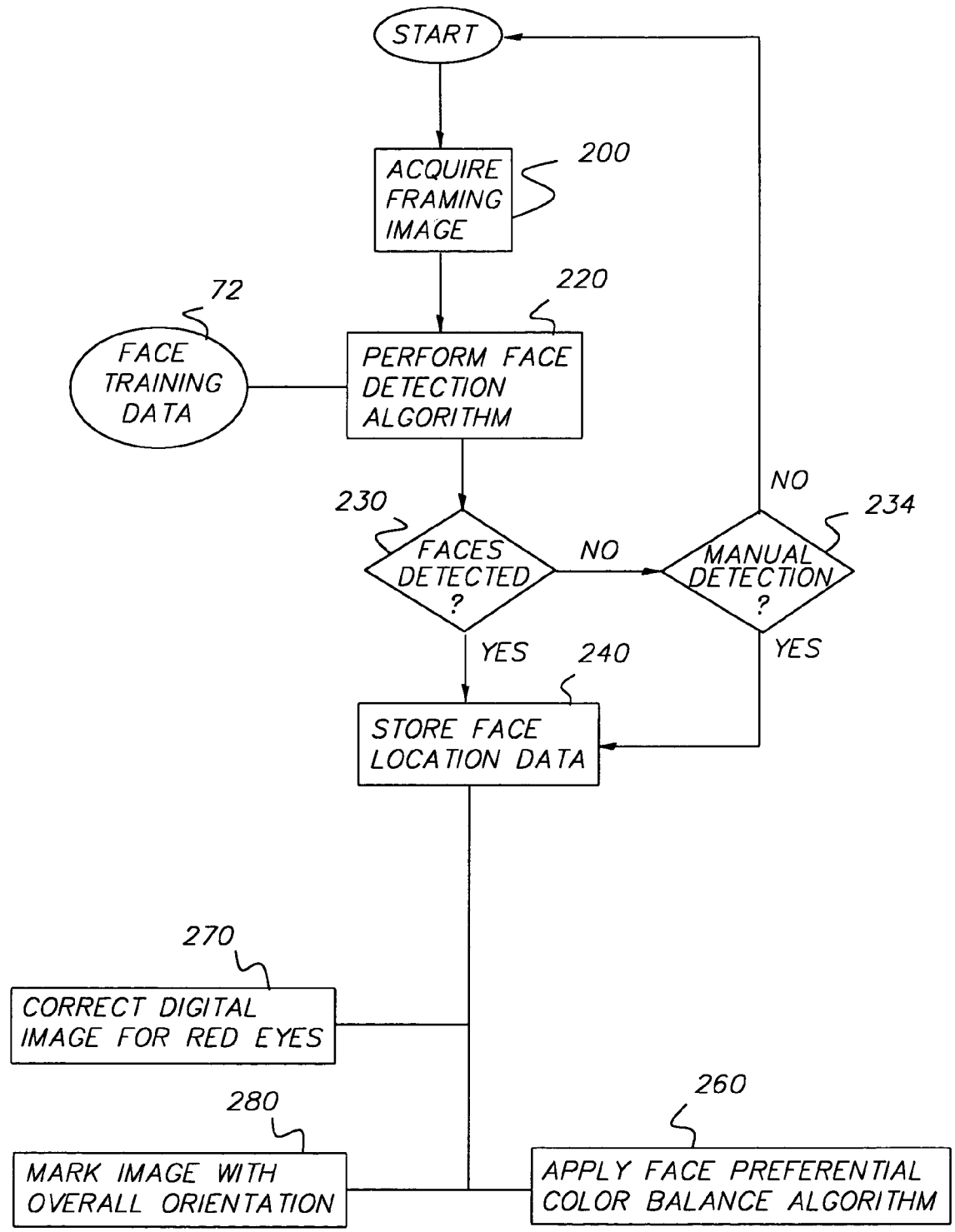
FIG. 4 is a flowchart diagram of camera operations involved in the operation of the camera shown in FIG. 1 in a final image mode.

As shown in the diagrams of FIGS. 3 and 4, respectively, the camera operates first in a framing mode and then in a final imaging mode. In each mode, the camera offers a number of automated features to assist the photographer. The photographer has the option of disabling the framing mode through the user interface adapter 50, thereby disabling acquisition of the framing image and going directly to the final imaging mode.

Framing Mode

In the framing mode shown in FIG. 3, the camera 10 obtains a framing image in step 100 by activation of the capture section 20. The CPU 30 then performs the face detection algorithm 90 in step 120, by which it attempts to detect any faces in the framing image and indicate their locations to the photographer in the viewfinder 28 or on the display device 34. More specifically, the face detection algorithm utilizes face training data from the training database 72 to find faces. If faces are detected in the decision block 130, then face location data is stored in step 140 in the RAM 42 for subsequent utilization by one or more of the camera algorithms. Furthermore, the facial locations are processed by the display interface 70 and, e.g., the faces produced on the display device 34 are outlined with a box or some other kind of outlining feature. If the face detection algorithm 90 is unable to find any faces, this fact is reflected in the outcome of the decision block 130. Thus, in response to a face detection failure, i.e., when no faces are found, the photographer can return to the beginning via path 132 and slightly repose the scene and allow another chance at detection, or can choose in a manual decision block 134 to provide manual detection input to the camera using the cursor 58 to manually locate a face in the viewfinder 28 or on the display 34. Other input techniques can be used, for example, a touch sensitive screen and stylus (not shown). Then, armed with knowledge of face presence and face location in the framing image, the camera 10 is able to provide valuable services to the photographer that can be used to improve the final captured image. Such services include focus assistance, exposure and flash determination and composition aids, as follows.

Focus assistance. Many modern cameras provide automatic focusing or user-designated focusing using a focusing aim point in the view finder. Since people, when they appear, are usually the most important subject in images, it is reasonable to properly focus the image on the faces of people unless directed otherwise by the photographer. Systems are presently known (see, e.g., U.S. Pat. No. 5,749,000, which is incorporated herein by reference) which include multiple focus detection areas and a steerable selection mechanism which selects one of the areas in response to an input stimulus (such as a voice instruction). Alternatively, as shown in the aforementioned '809 patent, autofocus can be performed within a measuring frame that is set to include a face. In connection with the present invention, after performing face detection on the framing image, the camera 10 engages the focus control algorithm 86 in a focus step 150 to use its steerable auto-focusing system in the optical section 21 to select a particular focus detection area that will focus the image optimally for the preponderance of the faces in the scene. (Alternatively, the focus could be set optimally for the largest face in the scene, which is presumed to constitute the primary subject.)

Exposure and flash determination. The camera 10 provides automatic exposure control and flash engagement through its exposure control algorithm 82 and flash control algorithm 84. A typical microprocessor-controlled exposure control apparatus is disclosed in U.S. Pat. No. 4,503,508, which is incorporated herein by reference, and used for both ambient and flash exposure. The exposure control functionality provided by this patent can be confined to, or weighted for, a facial area located within the measuring window 49a described in relation to the aforementioned '809 patent. Since people are usually the most important subject in images in which they appear, it is reasonable to choose the exposure to optimize the appearance of the faces of people, unless directed otherwise by the photographer. After performing face detection on the framing image, the camera will use utilize its auto-exposure algorithm 82 to set image exposure optimally in a step 160 for the detection area corresponding to the preponderance of the faces in the scene. (Alternatively, the exposure could be set optimally for the largest face in the scene, which is presumed to constitute the primary subject.) Similarly, the exposure control algorithm 82 will determine whether to fire the flash 27 based on its assessment of the adequacy of the illumination of faces in the scene. If the illumination is inadequate, the flash control algorithm 84 will activate and control the flash unit 27 in a step 170.

Composition aids. The face detecting camera 10 provides a composition-assistance mode in step 180 in which composition advice is provided to the photographer. Many consumer photographs suffer from poor image composition from an aesthetic point of view. Along with improper focus and exposure, poor composition is probably a leading cause of dissatisfaction with consumer image prints. A number of heuristic "rules-of-thumb" have become widely accepted as good principles of composition that result in pleasing images. For example, a small main subject frequently makes for an uninteresting print. Also, the "rule of thirds" calls for the main subject to be placed at roughly the one-third point in the image, either vertically, horizontally, or both. Such principles are discussed in detail in Grill, T. and Scanlon, M., *Photographic Composition*, Amphoto Books, 1990.

Figure 5:
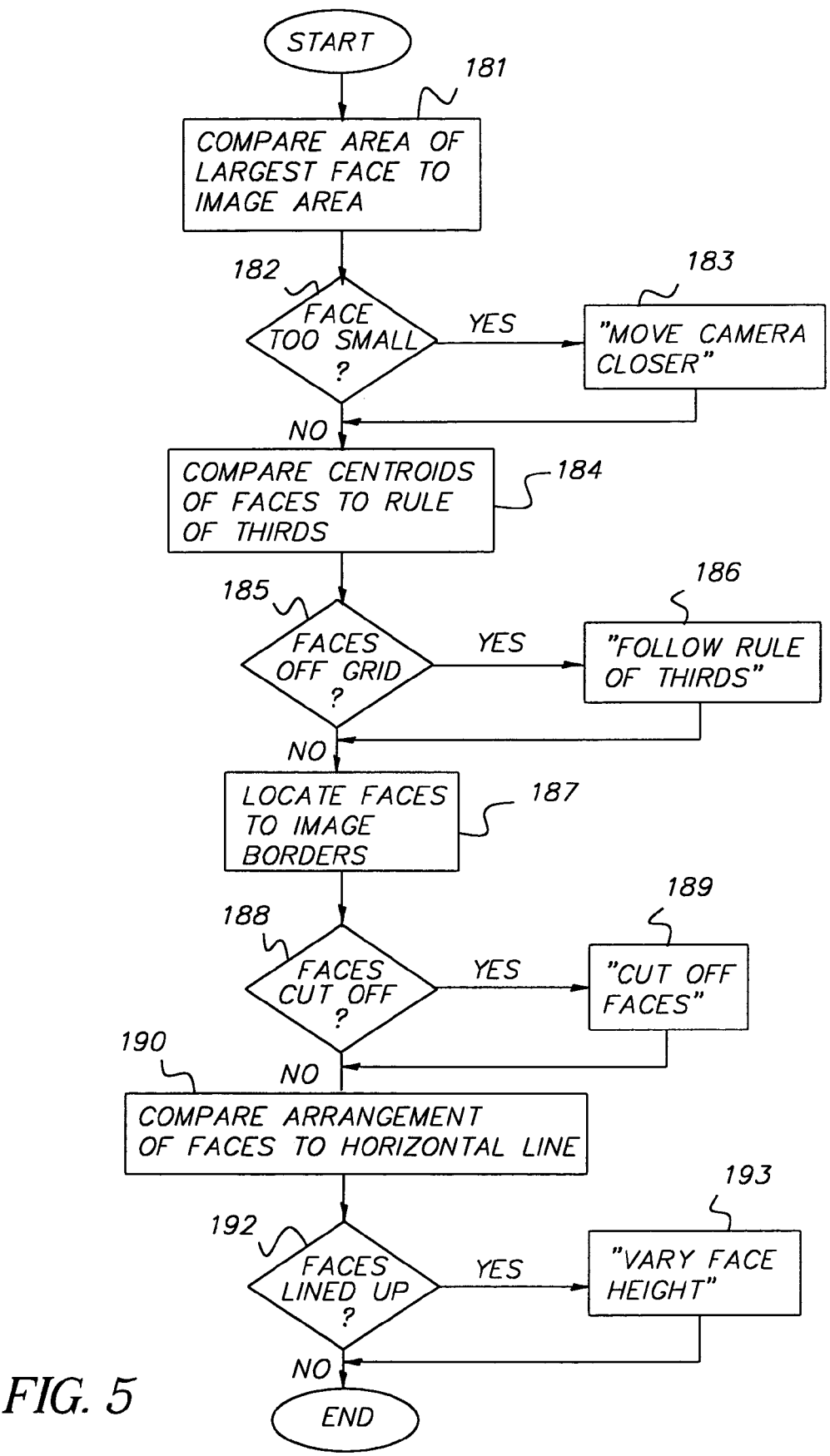
FIG. 5 is a flowchart showing the generation of composition suggestions.
Figure 6:
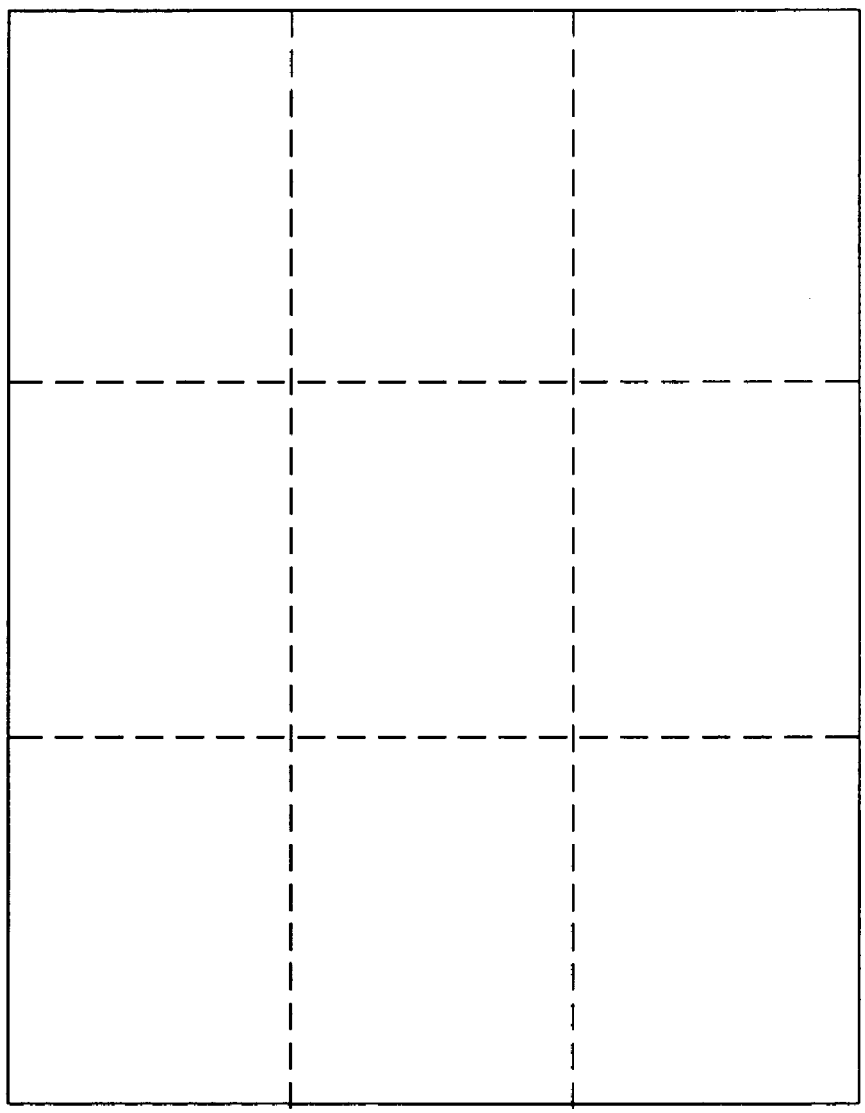
FIG. 6 is an illustration of an image area divided into a grid for application of the rule of thirds.
Figure 7A:
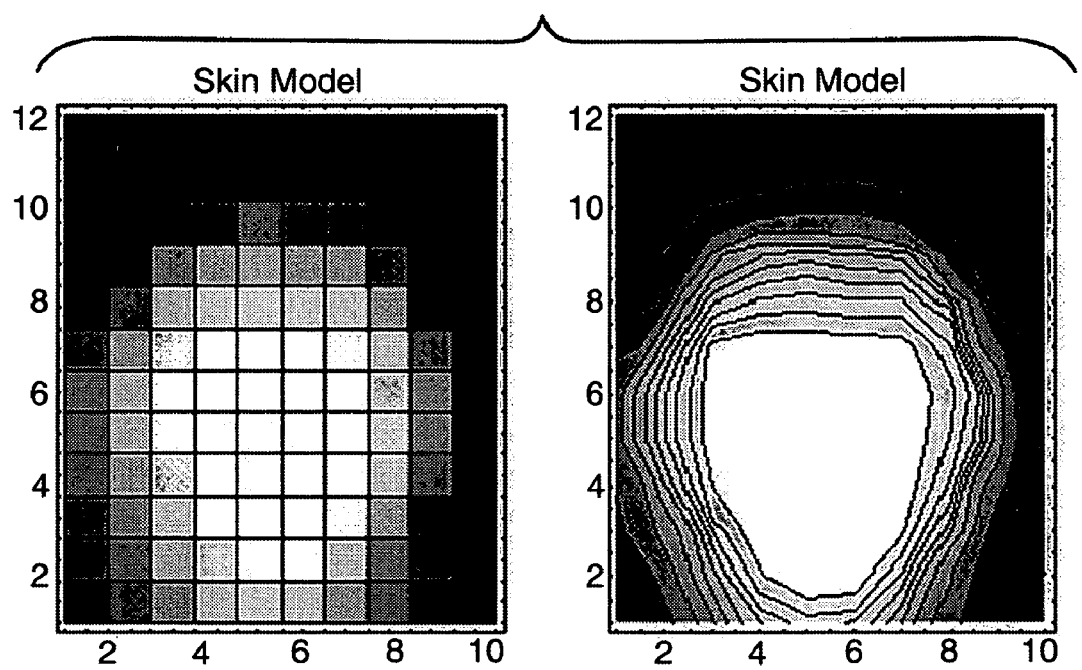
FIG. 7 is an example of the shape models for frontal and right semi-frontal poses used in one of the face detection algorithms.
Figure 7B:
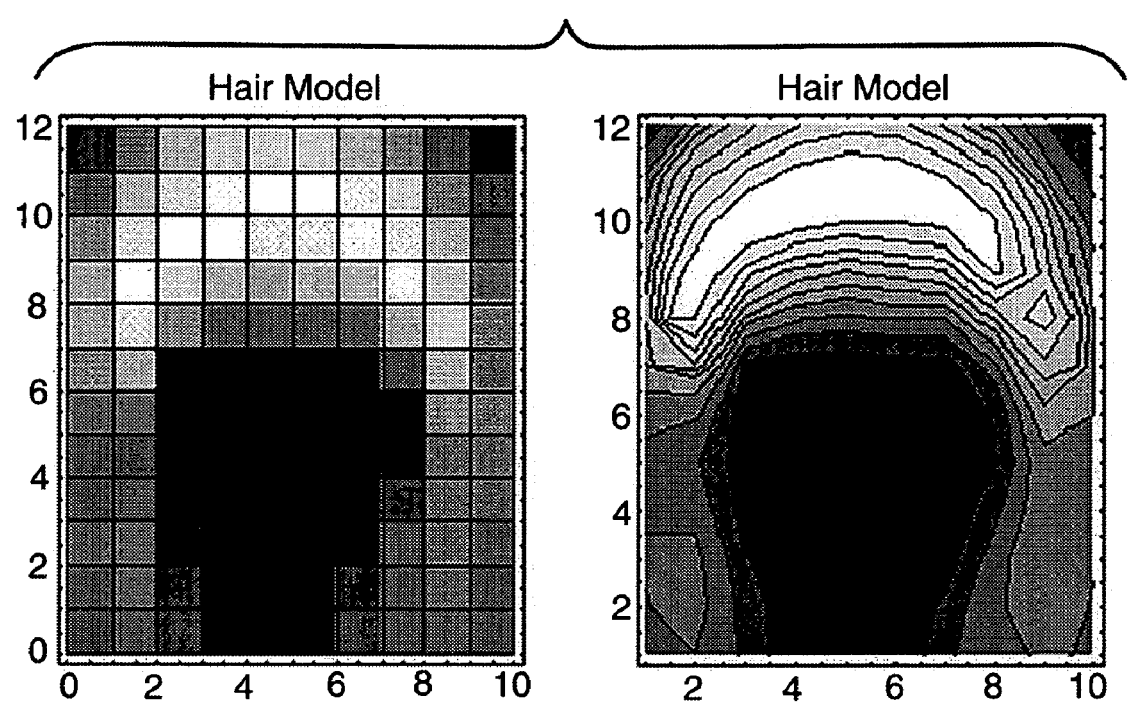
Figure 7C:
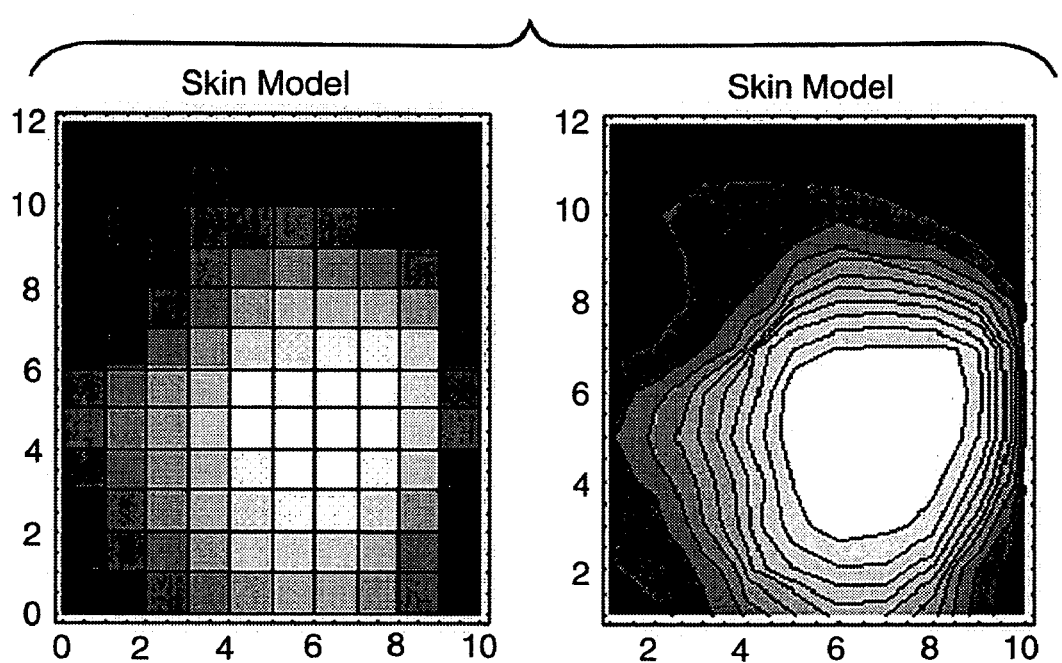
Figure 7D:
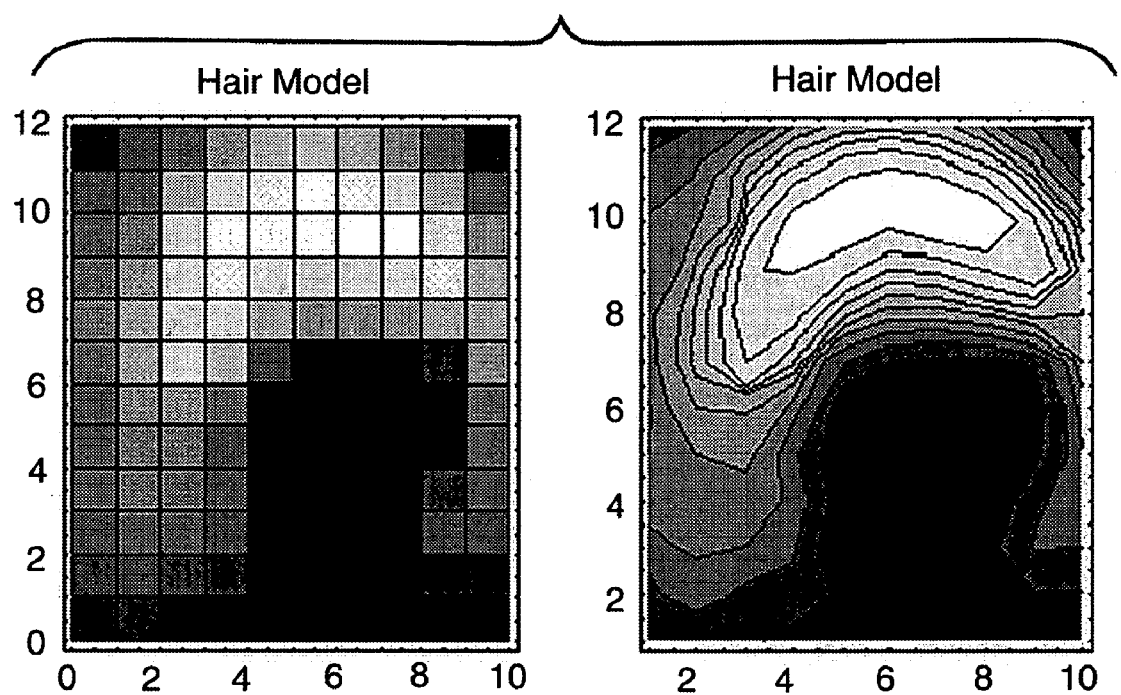
Figure 8A:
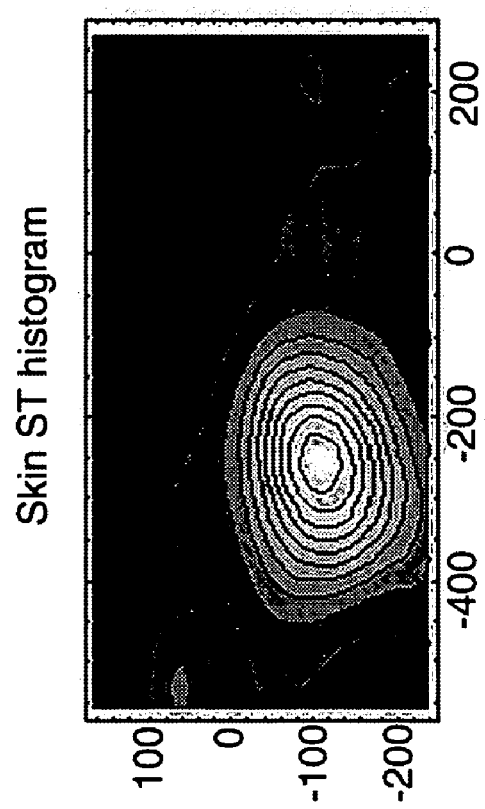
FIGS. 8A and 8B show graphical displays of probability densities for skin, which are used in one of the face detection algorithms.
Figure 8B:
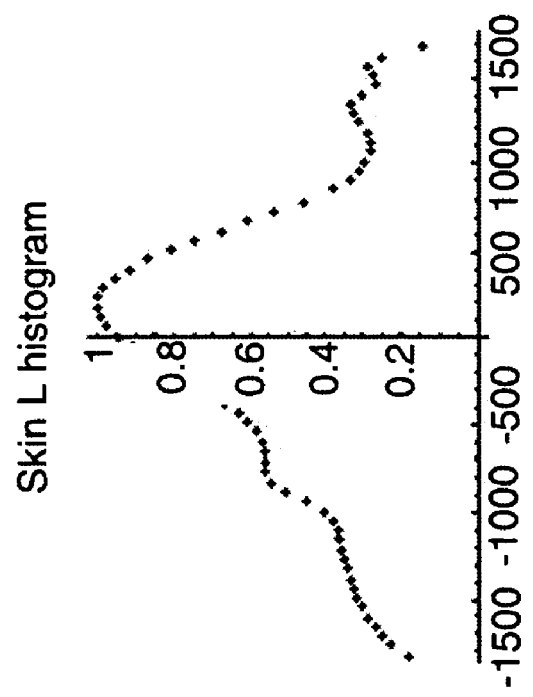
Figure 9A:
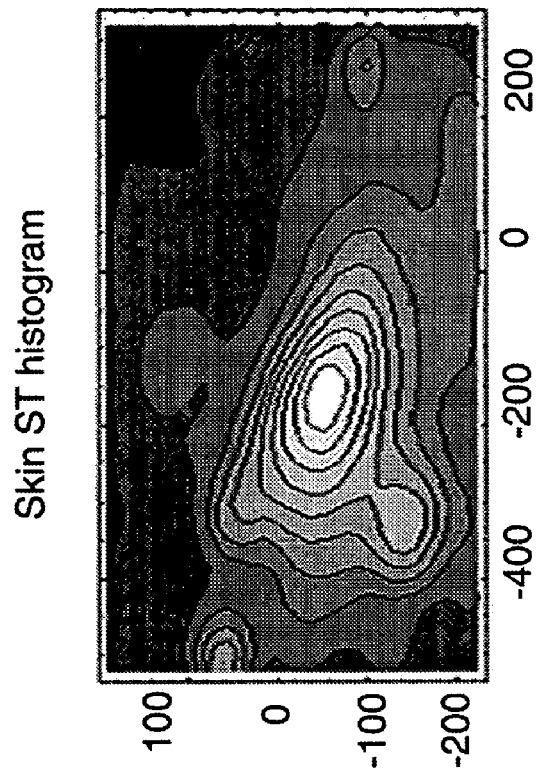
FIGS. 9A and 9B show graphical displays of probability densities for hair, which are used in one of the face detection algorithms.
Figure 9B:
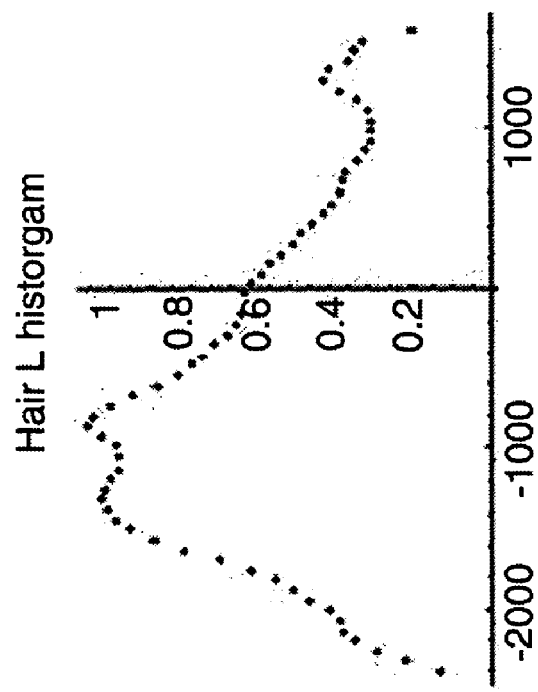

The face detecting camera 10 provides the composition-assistance mode 180 in which, based on the results of face detection in the framing image, a composition algorithm 92 is enabled to generate composition suggestions that appear in the viewfinder or the display device 34. The composition algorithm follows the steps expressed in FIG. 5, although it should be clear that other composition elements could be examined (such as described in the Grill and Scanlon reference). One aid compares the area of the largest face detected to the overall image area (step 181). If the comparison exceeds a threshold (step 182) indicating the faces are too small, the display 34 suggests that the camera be moved closer to the main subject (step 183). A second aid compares (step 184) centroids of faces to grid lines as shown in FIG. 6 that are representative of the rule of thirds, namely, positions in the image where principal subject matter tends to most pleasing (which is described in more detail in the Grill and Scanlon reference, page 22). If faces are substantially off the grid lines (step 185), then the display 34 suggests placing the main subject according to the rule of thirds to achieve a more pleasing image (step 186). A third aid locates faces intersecting image borders (step 187). If a threshold indicates that a substantial amount of the face is cut off by the camera aperture (step 188) then the display 34 is set to alert the photographer (step 189). A fourth aid relates the centroids of the faces to a horizontal line (step 190). If the faces seem to lie along a common horizontal line (step 192) the display 34 suggests that the heights of faces in an image of groups of people be varied, rather than aligned horizontally, to produce a more interesting image. The illustration in FIG. 5 is meant to be generally illustrative of such an algorithm and other composition principles such as described in the aforementioned Grill and Scanlon reference, which is incorporated herein by reference, may be implemented in a similar fashion.

Final Image Mode

Immediately after capture and processing of the framing image as shown in FIG. 3, the camera is ready to acquire the final image as shown in FIG. 4, having provided the photographer with the aids mentioned in steps 150–180 as described in the previous section. The initial steps 200–240 shown in FIG. 4 are identical to similarly identified steps 100–140 in FIG. 3, and therefore will not be further described. Additionally, in FIG. 4, further aids operate directly on the final image. As mentioned before, the photographer may choose to operate only with a final image (eliminating the framing image) if only the second group of aids is desired. Alternatively, if the framing image seen on the display device 34 was deemed satisfactory to the user, it can be saved as the permanent image. In either case, several services are provided as part of the final image mode, including optimal color balance, red eye notification and correction, orientation marking and face labeling, as follows.

Optimal color balance. While the human visual system demonstrates marvelous ability to maintain perceptual constancy of colors across different scene conditions, neither analogue nor digital cameras possess the same capability. For example, to the human eye, the color of an object appears the same whether the object is viewed in sunlight, sky-light, or tungsten light; whereas these three scene conditions, when captured on a single type of photographic film, will necessarily lead to the reproduction of very different colors. Therefore, it is customary to apply color balancing algorithms (CBAs) to captured images prior to printing or other display of the images. The current state-of-the-art of automated color balance algorithms seeks mainly to compensate for the most prominent scene illuminant.

A better job of color balancing an image can be performed by taking into account some understanding of the nature of the objects in the scene, and their relative importance. If an entire scene be reproduced correctly, and yet the color of faces is noticeably wrong, then the reproduced image will not be acceptable. People are very sensitive to incorrect reproductions of skin tones, although the specifics of perceived offenses of reproduction vary from culture to culture. The variations in skin tones among different persons and ethnic groups can be statistically categorized and understood. Furthermore, it fortuitously happens that the natural variations of skin colors and the offensive errors in skin color reproduction tend to lay in orthogonal directions in properly selected color space representations. Skin colors vary along the blue-red dimension, while unacceptable reproduction errors primarily concern the green-magenta dimension.

Knowledge of the presence and location of faces in a scene can lead to improved color balancing in two different ways. If only global image correction is available (as in optical printing of analogue images), then the estimate of global illumination can be adjusted so as to result in a pleasing rendering of the skin tones of the faces. The face detecting camera, by recording the location and sizes of faces in the magnetic layer of the analogue film medium 25, enables later optical photofinishing equipment to optimize the color balance for proper reproduction of skin tones on the face. On the other hand, if a digital processing step is available, then the facial region can be corrected independently of more global considerations of illumination. This is the best possible scenario, leading to a better print than could be obtained by solely optical means, because both the primary subjects (people) and the background regions can be pleasingly reproduced. In either case, the camera 10 utilizes its color balance algorithm 88 in a face preferential correction step 260 to provide optimal color balance for the image based at least in part upon the located faces. More specifically, the CPU 30 interacts with the measuring frame 49a generated by the tracking stage 49 to collect color data from the detected face(s) and then to weight the color balance algorithm 88 for the facial area.

Red eye notification and correction. A red-eye detection algorithm 80, such as the one disclosed in commonly assigned U.S. Pat. No. 5,432,863, which is incorporated herein by reference, is run in the red eye correction step 270 against the final captured image. The detected presence of a face is used as additional evidence in the red-eye algorithm 80 to help prevent false positive errors. A pair of detected red-eyes should be corroborated by the re-enforcing evidence of facial presence. The existence of red eye can also be provided by the red eye detection algorithm to the display interface 70, which can designate an appropriate warning in the display device 34. After receiving red-eye notification, the photographer may choose to obtain another image. Or, the automatic red-eye correction algorithm can be invoked to remove the offensive red highlights in the eyes if the camera 10 is a digital camera.

Orientation marking. Many consumer photo-finishing orders are now returned with an index print of small versions of each image in a sequence. The utility of the index print is diminished if the images are not all printed in the proper natural orientation. The presence of faces in an image provides a powerful cue as to its proper orientation. For instance, the facial dimensions can be separated into their principle axes, and the longest axis can be taken as the up-down axis; then one of the face detection algorithms to be described can distinguish the hair region and thereby infer an upright orientation. The majority of faces will be upright or close to upright, in the sense of overall image orientation. The face detection algorithm 90 in the face detecting camera 10 will determine orientation and tag each captured image on the image storage device 32 (or 25) with a notation of the proper orientation as suggested by the face orientation detected in the orientation step 280.

Face labeling. Once faces have been detected, a simple face recognition algorithm can be applied to identify faces from a small gallery of training faces that the camera has previously captured with help from the user and stored in the training data base 72. The gallery could contain the individuals in a family, for example, or children in a school class. When a new image has been captured by the camera, and the faces detected, the identity of each individual, established by the face recognition algorithm, can be recorded with the image in the digital storage 32 or magnetic layer of the film 25. Such face identity information flows with the image into photofinishing or subsequent computer processing. The information can be used to automatically label prints with the names of the people in the image. Other possible applications include automatically producing albums that contain images of a single person or a group of persons specified by the customer. For a typical face recognition algorithm, there are a number of commercially available face recognition products available that offer software development kits, allowing their algorithms to be embedded as larger systems. For example, the "Face-It" system produced by Visionics Corp. would be suitable for use as a face recognition algorithm.

Face Detection Algorithms

A face detection algorithm that operates in a digital camera must meet the criteria necessary for success given limited computational and computer memory resources. That is, the algorithm must operate rapidly (say, in less than one second) and with sufficiently high performance in terms of true positive/false positive detection rates. Counterbalancing the limited resource base, the fact that the results of the algorithm will be presented to or used by a human operator implies that some tolerance will exist for algorithm failures. This tolerance is an enabling characteristic of the proposed invention.

In this embodiment, we propose for usage a combination of two face detection algorithms whose joint usage provides higher performance in terms of detection levels than either algorithm individually. The first detector, component W, is a very fast pre-screener for face candidates. The second detector, component S, is a sophisticated pattern matching algorithm characterized by a very low rate of false positives. Face candidates labelled by component W will be subsequently examined by component S to result in a final detection decision.

The Component W

Wu et al. published a face detection algorithm (hereinafter, as modified, the component W) that is well suited for inclusion in a digital camera (see Wu, H., Chen, Q. and Yachida, M., "Face Detection from Color Images Using a Fuzzy Pattern Matching Method", *IEEE Trans. Pattern Analysis and Machine Intelligence*, 21(6), 557–563, 1999, which is incorporated herein by reference). The algorithm is very fast and requires very small amounts of both program memory and trained state. The Component W is a kind of ad-hoc pattern recognizer that searches for image windows that seem likely to contain faces based on color characteristics. The method essentially looks for windows in which the central portion seems likely to contain skin, based on its color and shape; and surrounding regions (around the top and sides of the skin) that seem likely to contain hair, again based on color and shape. Since the method is based on color signals, it requires that the imagery on which it operates be encoded in a meaningful color metric.

The component W has a training phase and a test phase. The training phase comprises the collection of skin and hair color distributions, and the gathering of shape models from suitable training examples. In the test phase, a window is scanned over the image and a complete range of scales and positions. The component W implicitly assumes that the upward orientation of the image is known, and that the faces are roughly aligned with the image orientation. This assumption could be relaxed by carrying out the entire face search several times—probably three, since the camera would not be used upside down—once for each possible image orientation. In the test phase, the algorithm applies the following steps once for each image window to be examined:

1) Compute skin and hair probability maps. Comparison of each pixel in a digitized image with pre-determined probability tables of skin and hair colors, leading to a posteriori probability that the pixel represents human skin or hair. The probability tables must be collected off-line and stored in the camera. They are collected with the same imaging sensor as in the digital camera, using identical spectral sensitivities.
2) Convert probabilities to estimated area fractions via non-linearity. Face shape models are built from training examples, also off-line. These models encode the likelihood of the occurrence of skin and hair colors in each cell of a rectangular grid overlaid on spatially normalized human faces in a small set of standard head poses.
3) Perform fuzzy pattern matching with face shape models. A rectangular window is scanned to each pixel position of the image in turn, and a judgment is made as to whether the window contains a face. To accommodate faces of varying sizes, the scanning process is repeated with windows varying over a range of sizes. The judgment of whether a face is present in a window of the image is based on a fuzzy comparison between the pre-determined face shape models and the actual distribution of posteriori skin and hair probabilities in each cell of the window. The fuzzy comparison makes use of parameterized non-linearities, as described in the Wu et al. article, that are adjusted in a calibration stage in order to provide the best results.

Each of these steps are now described in more detail after introducing the face shape models. It should also be understood that extensive detail can be found by referring to the Wu et al. article.

Shape models. The head shape models are low-resolution representations of the spatial distribution of skin and hair in typical face poses. There is one model for skin and one model for hair for each distinct pose. Each model consists of m×n cells (currently, m=12 and n=10), with each cell encoding the fraction of the cell that is occupied by skin (for skin models), or hair (for hair models) for typical heads in a given pose. An image window can be spatially corresponded with the cells in the shape models. Depending on the window resolution, a single pixel or a block of pixels may correspond to each model cell. The models were built using a set of training images to which affine transformations have been applied, in order to place the two eyes in standard positions. The spatially normalized images were then manually segmented into skin and hair regions, and the fractional cell occupancy, at the resolutions of the models, was computed. An example of the shape models for frontal and right semi-frontal poses is shown in FIG. 7. The models are stored in the training database 72 (shown in FIG. 1) with gray-level encoding of the occupancy fraction.

Compute hair and skin probability. The objective at this point is to acquire probability distributions for skin and hair colors from training images. The goal is to obtain probability tables of the form P(skin|color) and P(hair|color). Instead of using the Farnsworth perceptually uniform color space as suggested in the Wu et al. article, the present invention uses (L,s,t) color space as a preferred color metric for distinguishing skin and hair regions, and therefore performs probability training and application in the (L,s,t) color metric, where L= c(R+G+B); s=a(R−b); t=b(R−2G+B); a, b and c are constants; and R, G and B are image values proportional to relative log scene exposure. This metric has proven to be an effective color space in which to perform image segmentation. While all three channels are used, the luminance channel is separated from the combined chrominance channels in the probability histograms.

To gather skin color statistics, an annotated database including some 1800 images was used, each image stored in 12 bit, relative log scene exposure RGB metrics. Human judged color balance and white point aims were available for these images, as well as the eye locations of all faces in the database with two eyes visible. Using an anthropometrically average face model, the skin pixels of the faces were extracted for all faces in the database. The color balance and white point aims were also subtracted from the images in each case. The pixel values were then converted to the (L,s,t) metric using the matrix computation:

$$\begin{pmatrix} L \\ s \\ t \end{pmatrix} = \begin{pmatrix} \frac{1}{\sqrt{3}} & \frac{1}{\sqrt{3}} & \frac{1}{\sqrt{3}} \\ -\frac{1}{\sqrt{2}} & 0 & \frac{1}{\sqrt{2}} \\ -\frac{1}{\sqrt{6}} & \sqrt{\frac{2}{3}} & -\frac{1}{\sqrt{6}} \end{pmatrix} \begin{pmatrix} \hat{r} \\ \hat{g} \\ \hat{b} \end{pmatrix}$$

where the hatted quantities have been adjusted for the aim values. To gather hair color statistics, an analogous process was performed, with the exception that the hair regions were manually segmented for each example head. Each pixel of skin or hair results in an example of a color in the (L,s,t)

space. Separate probability histograms were accumulated for both hair and skin. The L histograms were compiled separately from the two dimensional s,t histograms in each case. Thus, an implicit assumption is taken that the colors and luminance of skin and hair are independently distributed. At test time, an image is first processed by using the color values at each pixel to look up posteriori likelihoods that either skin or hair was imaged to that pixel. Bayes' theorem is applied to the probability distributions to ensure that the distribution of colors in world objects is taken into account. The result of this computation provides two graphical displays of the skin and hair probability density, as shown in FIGS. 8A and 8B, and 9A and 9B, respectively, where each graphical display represents two views of skin and hair pixel probabilities, respectively, separated between luminance and chrominance components.

Map skin and hair probabilities to estimated area fractions. The shape models contain information about the spatial distribution of colors in face images, while the probabilities computed in the previous step depend on the average color in candidate facial regions. Since they are different, the two categories of information cannot be directly compared. Therefore, an intermediate step is needed to map the probability values in an image window into estimated skin and hair occupancy fractions by the use of a non-linear mapping function. The non-linear function is a sigmoidal-type function with adjustable parameters a and b, and is given by the following equation.

$$S(x) = \begin{cases} 0 & x \leq a \\ \frac{2(x-a)^2}{(b-a)^2} & a < x \leq \frac{(a+b)}{2} \\ \frac{2(x-a)^2}{(b-a)^2} & \frac{(a+b)}{2} < x \leq b \\ 1 & b < x \end{cases}$$

The Wu et al. article claims to adjust the parameters a and b separately for each of the skin and hair models based on empirical experiment in order to produce the best face detection results. In the present invention, the mapping non-linearity was found to be most useful to compensate for the deficiencies in the statistical sampling of skin and hair colors. For this reason, the parameters a and b are set quite low. The goal is for the component W to almost never miss a face, counting on further processing by algorithm S to eliminate the many false detections that pass through the component W.

Perform fuzzy pattern matching with face shape models. Given the shape model, with skin and area coverage fractions for each cell, and estimates of the same quantities for corresponding image regions coming out of the non-linear mapping, a judgment is made as to the similarity between the image regions and the model cells. The similarity measure uses a two term "fuzzy relation":

$$\text{similarity}(I_s, I_h, M_s, M_h) = e^{-a \cdot \text{dist}(I_s, I_h, M_s, M_h)^b}$$

$$\text{dist}(I_s, I_h, M_s, M_h) = \sqrt{(I_s - M_s)^2 + (I_h - M_h)^2}$$

where the parameters a and b (different from those in the non-linearity mapping of the previous section) determine the shape of the comparison, and the I and M subscripted variables represent the skin and hair probabilities from an image region and a model cell, respectively. Increasing b gives exponentially steeper penalties to differences between the shape model and the image window. In this embodiment, the values a=2 and b=1 were selected after some experimentation. The similarity score for the entire image window is taken as the average similarity score over all cells of the shape model. A threshold can be applied to the similarity measure to identify face candidates detected by the Component W.

Component S

Complete details of the Schneiderman algorithm (hereinafter, component S) appear in Schneiderman, H. and Kanade, T., "Probabilistic Modeling of Local Appearance and Spatial Relationships for Object Recognition", *Proc. CVPR* 1998, 45–51, which is incorporated herein by reference. The main steps of the method are outlined here in order to provide a self-contained description and to highlight differences and improvements with respect to the reference. The Component S implements a Bayesian classifier that performs maximum a posterior classification using a stored probability distribution that approximates the conditional probability distribution P(face|image). The method is called Bayesian because of the use of Bayes' theorem to convert the a priori measured training distribution P(image|face) into the posterior distribution in the presence of evidence from an image. The evidence consists of the pixel values in a spatial- and intensity-normalized image window. The use of Bayes' theorem is mandated by the observation that image evidence can be ambiguous. In some cases, objects and scenes not in the class of interest (i.e. faces, in this context) can give rise to image patterns that can be confused with class (=face) objects. Bayes' theorem requires the collection of representative non-class images, known as "world" images. The collection of world images proves to be the most difficult and critical process involved with training the algorithm. The difficulty lies in the fact that the world is very diverse. Faces are not diverse (at least when compared to the world), and so collection of training examples of faces is quite straightforward. This difficulty will be discussed at length in a following section on training.

The simplifications made to the distribution $$P(\text{face}|\text{image}) \quad (1)$$

that are described herein change a huge, uncountable distribution into a very practical one. The goal is to arrive at a simplified distribution P(face|distilled-image-features), where the distilled image features can be counted up and grouped during training in, say, one million bins. A heuristic of training classifiers would indicate that two orders of magnitude more examples than bins are needed. Hence, $10^8$ examples might be required to populate $10^6$ bins in a statistically meaningful way. It is eminently possible to collect that many examples, especially if we are permitted to generate some of them computationally, and if the "unit" of an example is something smaller than an entire human face.

Simplifications are applied in the order listed here and are described in the sections that follow:
(1) standardize face region size
(2) decompose face region into subregions
(3) ignore dependencies between subregions
(4) project subregions to lower dimension representation using PCA
(5) code projections using sparse coefficients
(6) quantize sparse coefficients (7) decompose appearance and position
(8) ignore position for uncommon patterns
(9) vector quantize positional dependence for common patterns
(10) apply (1)–(9) at multiple resolutions, assuming independence between resolutions 1. Standardize face region size. Spatially normalized faces will be presented in a 56×56 pixel window. This simplification changes equation (1) into $$P(\text{face}|\text{region}) \tag{2}$$

where region is exactly a rasterized vector of pixels from a 56×56 pixel image window.

2. Decompose face region into subregions. Each face region is decomposed into multiple overlapping 16×16 pixel subregions. These subregions can be anchored at every pixel position in the region, or at a subset of these positions. We anchor subregions at every third pixel in every third line. With this choice, there are 196 possible anchor positions of a subregion within a face region; this position can therefore be encoded in a single byte. On the right hand side of (2), "region" can be replaced with "{subregion}", an aggregate of subregions. The subregion size is chosen so that individual subregions, when suitably positioned, are large enough to contain facial features (such as eyes, nose, or mouth). This size limits the largest image feature that can be examined as a coherent unit.

3. Ignore dependencies between subregions. No attempt is made to model the statistical dependencies between subregions. This simplification therefore limits the type of object attributes that can be modeled. For example, while a single subregion can contain sufficient pixels to capture an eye, the other eye will fall into a different subregion, and there can be no consideration taken of similarity or dissimilarity between the two eyes. Nor can any reasoning be based on the relative levels of illumination of different parts of the face. Using this simplification, equation (2) can now be replaced with $$\prod_{i=1}^{\#subregions} P(\text{face}|\text{subregion}_i) \tag{3}$$

where the statistical independence is reflected in the lack of joint dependencies on multiple subregions.

4. Project subregions to lower dimension representation using principal components analysis (PCA). Since subregions contain 256 pixels, with 256 gray levels each, the number of possible subregions is huge. The next simplification involves applying the standard technique of linear PCA to reduce the dimensionality of the subregion from 256 to twelve. (The choice of twelve dimensions is somewhat arbitrary. Upwards of 90% of actual subregion variance can be encoded using no more than twelve dimensions.) To perform the PCA, a large training set of face images was processed, with all subregions participating in the data analysis. Some experimentation was performed to see whether separate principal components are necessitated for different image resolutions and multiple face poses. Based on these findings, it was decided that distinct sets of principal components would be stored for each resolution, but that it was not necessary to keep different sets by face pose. Intuitively, it seems reasonable that at different resolutions the essential facial structures would exhibit unique spatial patterns, while the changes caused by slightly different facial poses would be less significant in the first few principal modes of variation.

The result of the projection step is that each image subregion becomes represented by the twelve projection coefficients along the principal component axes. This representation amounts to representing each subregion by a linear combination of twelve principal subregions. The projection operation is carried out by a matrix operation $$[\text{proj}] = A^T[\text{subregion}] \tag{4}$$

where A is the projection matrix whose columns contain the eigenvectors (principal components) of the training subregions. Note that the PCA operates on a training set of face images only. False (non-face) examples are not used since the resulting principal components would likely be subject to wide variability caused by statistically inadequate sampling of the very large set of possible non-face images. As a result of this step, expression (3) leads to $$\prod_{i=1}^{\#subregions} P(\text{face}|\text{proj}_i) \tag{5}$$

5. Code projections using sparse coefficients. Rather than retain all twelve projection coefficients, the subregion representation is further compressed by retaining only the six most significant. However, this sparse coding scheme is further complicated by grouping the last six coefficients pair-wise into groups and considering their sum square values when selecting the six projection dimensions to retain. In this way, twelve coefficients are reduced to six for subsequent processing.

6. Quantize sparse coefficients. Further compression of subregion representation occurs through discrete quantization of the nine coefficients using a Lloyd-Max quantizier. This quantizier minimizes the mean-square quantization error under the assumption of a Gaussian distribution of the independent variable. For common values of the number of quantization values, the bin breakpoints and the reconstruction levels of Lloyd-Max quantizers are tabulated in Lim. J., *Two-Dimensional Signal and Image Processing*, Prentice-Hall: N.J., 1990. To test the validity of the Gaussian distribution assumption, the actual distribution of the projection coefficients of the training set were collected, from which it was seen that the Gaussian assumption closely matches the actual distribution.

The choice of the number of sparse coefficients retained and the number of quantization levels allocated to each coefficient determines the number of possible quantization values that encode image subregions. Based on the choices of six prominent dimensions, with choices of 8, 4, or 2 quantization levels for each dimension, the algorithm as implemented can represent each subregion by one of approximately 1,000,000 numbers. These quantized numbers are somewhat inscrutably called "q1" values in the Schneiderman et al. reference. The number of possible q1 values is an algorithm sizing parameter referred to as "$n_{q1}$" in that reference.

Figure 10A:
FIG. 10 shows an original image and its reconstruction following principal component analysis in accordance one of the face detection algorithms.
Figure 10B:
Figure 10C:

The compression advantage of this quantization scheme becomes clear when it is seen that $256^{256}$ possible subregion patterns are encoded in $10^6$ distinct numbers. In fact, it is possible to consider this quantization scheme as a form of image coding. Reconstruction of the image from its coding gives a sort of approximation to the original image. FIG. 10 shows an original image and its reconstruction following PCA projection and sparse coding and quantization. More specifically, FIG. 10(a) shows the original image, FIG. 10(b) shows a reconstruction from projections of subregions into twelve dimensional principal component space and FIG. 10(c) shows a reconstruction from sparse coded and quantized version of FIG. 10(b). (Note that images (b) and (c) do not show all the encoded information. Rather, they show the reconstructions from the encoding with subregions aligned with a tiled grid of 56×56 face regions. Simultaneous encodings capture further image information as the subregions are offset relative to the region grid.)

Following the quantization step, the probability expression (5) is further simplified to $$\prod_{i=1}^{\#subregions} P(\text{face} \mid q1_i) \qquad (6)$$

7. Decompose appearance and position. At this point in the chain of simplifications of the probability distribution, expression (6) is expanded to explicitly include both the pixel pattern of a subregion and its position within the face region. Equation (6) is replaced with $$\prod_{i=1}^{\#subregions} P(\text{face} \mid q1, pos_i) \qquad (7)$$

where each subregion is now represented by its quantization value and its position within the face region. Interpretation of expression (7) intuitively leads to thoughts like the following: eye-like patterns ought to occur in face regions only in the subregions likely to contain eyes.

8. Ignore position for uncommon patterns. Given that 1,000,000 quantization levels and 196 positions are possible for each subregion, further simplifications of expression (7) must occur. Two more simplifications are made to this expression. First, a decision is taken to encode the positional dependence of only the most commonly occurring q1 patterns. To this end, a large sorting step orders the q1 patterns by decreasing frequency of occurrence in the training set. All q1 patterns that sort below an occurrence threshold will have their positional dependence replaced by a uniform positional distribution. The number of q1 patterns whose positional distribution is to be explicitly learned during training is an algorithm sizing parameter referred to as "$n_{est}$" in the Schneiderman reference. For the uncommon patterns, expression (7) becomes $$\prod_{i=1}^{\#subregions} \frac{P(\text{face} \mid q1_i)}{npos} \qquad (8)$$

where npos=196 is the number of possible subregion positions.

9. Vector quantize positional dependence for common patterns. The second simplification to expression (7) involves a further reduction in the number of positional distributions learned during training. Already, the simplification of section 8 has reduced the number of positional distributions to be learned from $n_{q1}$ to $n_{est}$. Now, a further reduction from $n_{est}$ to $n_{q2}$ will be performed by vector quantizing the nest surviving positional distributions into $n_{q2}$ representative distributions. For purposes of this quantization, the two dimensional positional distributions of the q1 patterns are rasterized into vectors. The number $n_{q2}$ is an algorithm sizing parameter.

The vector quantization training algorithm is not the standard LBG algorithm, but rather an ad hoc custom algorithm, performed on a single pass through the input vectors. This single-pass nature is important, since the training algorithm will likely be quantizing tens or hundreds of thousands of vectors, and therefore must show concern for speed. The training process is outlined as follows:

For each vector x
    Find the closest current pattern center
    Calculate the distance d between x and the closest center.
        The sum squared error (SSE) metric is used.
    If d<threshold
        Add x to cluster; update cluster center
    else
        Seed new cluster with x For this algorithm to function properly, it must of course handle empty clusters gracefully, and also deal with the imposition of a maximum number $n_{q2}$ of clusters. The cluster centers are computed as the average (ideally, weighted average by occurrence count) of the vectors that map to the cluster. The selection of the distance threshold is problematic and based essentially on empirical observation of the behavior of the quantization training when using different values of the threshold. The goal of this selection is to make full use of the available number of quantization levels while spreading out the distribution vectors as uniformly as possible.

Upon application of the vector quantization of positional distributions, the position pos in expression (7) is mapped to one of the VQ pattern centers, identified as pos'. Equation (7) then becomes, for more common patterns, $$\prod_{i=1}^{\#subregions} P(\text{face} \mid q1, pos'_i) \qquad (9)$$

10. Apply detection at multiple resolutions, assuming independence between resolutions. Since the statistical dependencies between subregions cannot be captured in the simplified probability model that has been developed, features larger than subregions cannot be considered. To overcome this limitation, multiple levels of image resolution are now introduced. The entire mechanism of the probability estimator in (2) will be applied to multiple levels of image resolution, leading to $$\prod_{j=1}^{nmags} \prod_{i=1}^{nsubs} P(\text{face} \mid q1_i^j) \qquad (10)$$

A typical example would be that of a single face captured at nmags=3 levels of pixel resolution. At each resolution, the eyes must reside at standard positions.

Full form of simplified probability distribution. Gathering together expressions (8) and (10), and applying Bayes' theorem to relate prior probabilities gathered during training to the posterior probabilities in these expressions leads to the full form (11) of the estimated likelihood of face presence in an image region. Details of the complete derivation of this equation appear in the Schneiderman reference.

$$P(\text{face} \mid \text{region}) = \prod_{j=1}^{nmags} \prod_{i=1}^{nsubs} P(q I_i^j \mid \text{face}) \frac{P(pos' \mid q I_i^j, \text{face}) P(\text{face})}{\frac{P(q I_i^j \mid \text{face})}{npos} P(\text{face}) + \frac{P(q I_i^j \mid \overline{\text{face}})}{npos} P(\overline{\text{face}})} \quad (11)$$

In this expression, P(face) and P($\overline{\text{face}}$) represent the prior probabilities that an image region either does or does not contain a face. In the absence of this knowledge, uniform priors equal to ½ are used, leading to a further simplification in the above expression (11). This assumption about prior probabilities does not affect the performance of the algorithm when used for pattern recognition of faces. Rather, it results in the presence of a scaling factor that must be taken into account when interpreting the algorithm output as a probability value.

Training steps—Phase I. While actual training of algorithm S involves a number of discrete steps, the training divides naturally into two major phases. The goal of the first phase is to obtain specific parameters of the quantization of face subregions. The initial step is to capture the covariance matrix and then principal components of the subregions from the training set. As part of this step, following extraction of the principal components, another pass is made through all the training subregions to gather the statistics of their projections unto those twelve principal dimensions. The projection data are then analyzed. The projection statistics are fed back into the training program to enable optimal design of the Lloyd-Max quantizer. Since the variation of face patterns is quite large when considered across different scales of resolution, this process of extracting principal components and the statistical distribution of the training data along those components must be repeated for each image resolution.

Training steps—Phase II. The second phase of training starts by passing through the training set and performing the quantization of each subregion of each face example. As mentioned above, the training set can be expanded by creating slightly perturbed versions of each training exemplar. The frequency with which quantized values appear is counted in a histogram having roughly 1,000,000 bins. Simultaneously, subregion positions at which each quantized value occurs are accumulated. A sort operation arranges the quantization frequency histogram in decreasing order of occurrence count. For the nest most frequency quantized patterns, the positional distributions enter into the vector quantization algorithm. Following vector quantization, only $n_{q2}$ seminal positional distributions are retained, and each of the $n_{est}$ frequent quantization values will have a positional distribution approximated by the retained distributions.

Applying the face detector. To use the trained face detection algorithm at test time, the computation of expression (11) must be applied to an image region on which spatial and intensity normalization have been conducted. Three different resolution versions of each candidate face region are required. The quantization value for each subregion is computed, and the various probability terms in expression (11) are extracted from the probability tables created during algorithm training.

To use expression (11) for face detection, a probability threshold must be selected. When the posterior probability exceeds the threshold, then face detection has occurred. After the algorithm training process has been completed, the threshold is determined by studying the classification performance of the algorithm when applied to a verification set of face and non-face images. The threshold is set for optimal performance on the verification set, taking into account the relative importance of false positive and false negative errors.

Dual Screening Face Detector—the Combined Algorithms

In the preferred face detection algorithm of the invention, those face candidates generated by the component W become input to the face detector of the component S. Since the window shapes of the two algorithms are slightly different, a spatial affine transformation serves to frame the face candidate and place the eyes in standard position for the component S. A threshold is applied to the output from the component S to declare the presence of a face in an image window.

Since the component W examines the image at a range of scales in a window that is scanned across the entire image, it is likely that a true face might be detected at more than one scale, and at several closely spaced window positions. Some method for combination of detection overlaps must be employed. Two different methods were tested. The first method simply used the strongest detection from a spatially overlapping group of detections. The second method computes the average eye locations of the overlapping detections. It was found empirically that the averaging technique resulted in more accurate eye positions, as judged visually by a human observer.

The invention has been described with reference to a preferred embodiment. However, it will be appreciated that variations and modifications can be effected by a person of ordinary skill in the art without departing from the scope of the invention.

PARTS LIST 10 camera
20 image capture section
21 optical section
22 image
23 image sensor
24 exposure control mechanism
25 analog storage device
26 recording device
27 flash
28 optical viewfinder
29 LCD overlay
29a LCD driver
30 CPU
32 digital memory
34 display device
40 system bus
42 RAM
44 ROM
46 I/O adapter
48 communication adapter
49 target tracking stage
49a measuring frame
50 user interface adapter
52 shutter button
54 flash controls
56 programmed exposure selection 58 user manipulated display cursor
60 algorithm interface adapter
70 display interface
72 training database
74 pattern signal generator
80 redeye correction algorithm
82 exposure control algorithm
84 flash control algorithm
86 focus control algorithm
88 color balance algorithm
90 face detection algorithm
92 composition algorithm
100–180 steps
181–192 steps
200–280 steps

What is claimed is:

1. A digital camera for capturing an image of a scene, said digital camera comprising:

a capture section for capturing an image and producing image data;

an electronic processing section for processing the image data to determine the presence of one or more faces in the image;

face data means associated with the processing section for generating face data corresponding to at least one attribute of at least one of the faces in the image;

a storage medium for storing the image data; and recording means associated with the processing section for recording the face data with the image data on the storage medium;

wherein the electronic processing section utilizes a face detection algorithm having a first component and a second component;

the first component comprising a pre-screening pattern recognizer that searches for image windows likely to contain faces, the first component having a first rate of false positives and determining a plurality of face candidates;

the second component comprising a posterior probability function classifier, the second component having a second rate of false positives lower than the first rate of false positives, and processing the plurality of face candidates to determine the presence of the one or more faces in the image.

2. The digital camera as claimed in claim 1 wherein the face data corresponds to at least one of the location, orientation, scale and pose of at least one of the faces in the image.

3. The digital camera as claimed in claim 1 wherein the electronic processing section further provides an indication that one or more faces have been detected.

4. The digital camera as claimed in claim 3 further comprising a framing device for framing the image, and wherein the electronic processing section provides an indication in the framing device identifying the one or more faces that have been detected.

5. The digital camera as claimed in claim 4 wherein the framing device is either an optical viewfinder that images the scene or an electronic display device that reproduces the image data.

6. The digital camera as claimed in claim 1 wherein the recording means records the captured image data in the storage medium in digital folders dedicated to images with a particular number of faces in the scenes.

7. The digital camera as claimed in claim 1 wherein the electronic processing section further includes a face recognition algorithm and a data base of known faces for generating facial identities, and wherein the recording means labels one or more images in the storage medium with the facial identities of known faces.

8. The digital camera as claimed in claim 1 wherein the capture section further includes an exposure control section responsive to the presence of one or more faces for optimally exposing the image for at least one of the faces in the scene.

9. The digital camera as claimed in claim 8 wherein the exposure control section optimally exposes the image for either the preponderance of faces in the scene or the largest face in the scene.

10. The digital camera as claimed in claim 8 wherein the capture section further includes a flash unit, and wherein the electronic processing section controls activation of the flash unit in order to optimize exposure for at least one of the faces in the scene.

11. A digital camera for capturing an image of a scene, said digital camera comprising:

a capture section for capturing an image and producing image data;

an electronic processing section for processing the image data to determine the presence of one or more faces in the scene;

face data means associated with the processing section for generating face data corresponding to at least one attribute of at least one of the faces in the image;

a composition algorithm associated with the processing section for processing the face data and generating composition suggestions for a user of the digital camera in response to the processed face data; and a display device for displaying the composition suggestions to the user.

12. A digital camera as claimed in claim 11 wherein the composition suggestions include at least one of (a) an indication that a main subject is too small in the image, (b) an indication that following the law of thirds will lead to a more pleasing composition, (c) an indication that one or faces have been cut off in the image, and (c) an indication that a horizontal alignment of subjects should be avoided in the image.

13. A digital camera for capturing an image of a scene, said digital camera comprising:

a capture section for capturing an image and producing image data;

an electronic processing section for processing the image data to determine the presence of one or more faces in the scene and generating face data therefrom;

an orientation algorithm associated with the processing section for generating orientation data indicating orientation of the image based on the orientation of at least one of the faces in the image;

a storage medium for storing the image data; and recording means associated with the processing section for recording the orientation data with the image data on the storage medium.

14. The digital camera as claimed in claim 1 wherein the posterior probability function classifier comprises a maximum a posteriori classifier.

15. A digital camera for capturing an image of a scene and producing image data, said digital camera comprising:

an algorithm memory storing an algorithm for determining the presence of one or more faces in the image, said algorithm comprised of a first component and a second component; and an electronic processing section for processing the image data together with the algorithm for determining the presence of one or more faces in the image;

the first component of the algorithm comprising a pre-screening pattern recognizer that searches for image windows likely to contain faces, the first component having a first rate of false positives and determining a plurality of face candidates;

the second component of the algorithm comprising a posterior probability function classifier, the second component having a second rate of false positives lower than the first rate of false positives, and processing the plurality of face candidates to determine the presence of the one or more faces in the image.

16. A digital camera for capturing an image of a scene and producing image data, said digital camera comprising:

an algorithm memory storing an algorithm for determining the presence of one or more faces in the image, said algorithm comprised of a first component and a second component;

an electronic processing section for processing the image data together with the algorithm for determining the presence of one or more faces in the image, said processing section generating processed image data and face data corresponding to at least one of the location, orientation, scale and pose of at least one of the faces in the image;

a storage medium; and an interface for transferring the processed image data and the face data to the storage medium whereby the face data is stored with the processed image data on the storage medium;

the first component of the algorithm comprising a pre-screening pattern recognizer that searches for image windows likely to contain faces, the first component having a first rate of false positives and determining a plurality of face candidates;

the second component of the algorithm comprising a posterior probability function classifier, the second component having a second rate of false positives lower than the first rate of false positives, and processing the plurality of face candidates to determine the presence of the one or more faces in the image.

17. A digital camera for capturing an image of a scene, said digital camera comprising:

an image capture section for capturing an image with an image sensor and producing image data;

an algorithm memory storing an algorithm for determining the presence of one or more faces in the image, said algorithm comprised of a first component and a second component; and an electronic processing section for processing the image data together with the algorithm for determining the presence of one or more faces in the image and controlling the capture of images by the capture section as a function of the presence of faces in the image;

the first component of the algorithm comprising a pre-screening pattern recognizer that searches for image windows likely to contain faces, the first component having a first rate of false positives and determining a plurality of face candidates;

the second component of the algorithm comprising a posterior probability function classifier, the second component having a second rate of false positives lower than the first rate of false positives, and processing the plurality of face candidates to determine the presence of the one or more faces in the image.

18. The camera as claimed in claim 17 wherein the electronic processing section controls the exposure of the image in relation to the presence of faces in the image.

19. The camera as claimed in claim 17 wherein the electronic processing section controls the focus of the image in relation to the presence of faces in the image.

20. The camera as claimed in claim 17 wherein the electronic processing section controls the illumination of the image in relation to the presence of faces in the image.

21. A digital camera for capturing an image of a scene and producing image data, said digital camera comprising:

an algorithm memory storing an algorithm for determining the presence of one or more faces in the image, said algorithm comprised of a first component and a second component; and an electronic processing section for processing the image data together with the algorithm for determining the presence of one or more faces in the image in order to produce processed image data that relates to the presence of faces in the image;

the first component of the algorithm determining a plurality of face candidates utilizing a pattern matching technique that identifies image windows likely to contain faces based on color and shape information;

the second component of the algorithm processing the plurality of face candidates using a maximum a posteriori classifier to determine the presence of the one or more faces in the image.

22. The camera as claimed in claim 21 wherein the electronic processing section is responsive to the location of faces in the image in order to produce processed image data that is color balanced for the faces in the image.

23. The camera as claimed in claim 21 wherein the electronic processing section is responsive to the location of faces in the image in order to produce processed image data that is corrected for red eye in the faces in the image.

24. The camera as claimed in claim 21 further including a display device and wherein the electronic processing section is responsive to the location of faces in the image in order to produce processed data that is applied to the display device to identify the location of faces in image data displayed on the display device.

25. The camera as claimed in claim 21 wherein the electronic processing section is responsive to the location of faces in the image in order to produce processed data that provides composition aids to a photographer using the camera.

26. A digital camera for capturing an image of a scene and producing image data, said digital camera comprising:

an algorithm memory storing a face detection algorithm for determining the presence of one or more faces in the image data and a composition algorithm for suggesting composition adjustments based on certain predetermined composition principles; and an electronic processing section for processing the image data together with the algorithms for determining the presence of one or more faces in the scene and their relation to certain predetermined composition principles, said processing section generating face data corresponding to at least one of the location, orientation, scale and pose of at least one of the faces in the image and composition suggestions corresponding to deviation of the face data from the predetermined composition principles.

27. The camera as claimed in claim 26 wherein the predetermined composition principle is location of the faces in relation to a rule of thirds.

28. The camera as claimed in claim 26 wherein the predetermined composition principle is the size of the faces in relation to the overall image.

29. The camera as claimed in claim 26 wherein the predetermined composition principle is location of the faces so as to prevent occlusion by edges of the frame.

30. The camera as claimed in claim 26 wherein the predetermined composition principle is variety in location of the faces with respect to a common line.

31. A hybrid camera for capturing an image of a scene on both an electronic medium and a film medium having a magnetic layer, said hybrid camera comprising:
   an image capture section for capturing an image with an image sensor and producing image data;
   means for capturing the image on the film medium;
   an electronic processing section for processing the image data to determine the presence of one or more faces in the scene;
   face data means associated with the electronic processing section for generating face data corresponding to at least one of the location, scale and pose of at least one of the faces in the image;
   means for writing the face data on the magnetic layer of the film medium; and
   orientation data means associated with the electronic processing section for generating orientation data indicating orientation of the image based on the orientation of at least one of the faces in the image;
   wherein recording means associated with the processing section records the orientation data on the magnetic layer of the film medium.

32. The hybrid camera as claimed in claim 31 further comprising:
   a storage medium for storing the image data; and
   recording means associated with the processing section for recording the face data with the image data on the storage medium.

33. The hybrid camera as claimed in claim 31 wherein the electronic processing section provides an indication that one or more faces have been detected.

34. The hybrid camera as claimed in claim 33 further comprising a framing device for framing the image, and wherein the electronic processing section provides an indication in the framing device identifying the one or more faces that have been detected.

35. The hybrid camera as claimed in claim 31 wherein the electronic processing section further includes a face recognition algorithm and a data base of known faces for generating facial identities, and wherein the recording means records the facial identities of known faces on the magnetic layer of the film medium.

36. The camera as claimed in claim 28 wherein the composition suggestions include moving the camera closer to the main subject.

37. The hybrid camera as claimed in claim 31 further comprising an exposure control section responsive to the presence of one or more faces for optimally exposing the film medium for at least one of the faces in the scene.

38. The hybrid camera as claimed in claim 37 further comprising a flash unit, and wherein the exposure control section controls activation of the flash unit in order to optimize exposure for at least one of the faces in the scene.

* * * * *